March 27, 1934. G. E. BOMBERGER Re. 19,122

CHICK BOX

Original Filed May 21, 1929

INVENTOR.
GEORGE E. BOMBERGER.

BY Fontum & Fontum
Goldsmith & Galt
ATTORNEYS.

Reissued Mar. 27, 1934 Re. 19,122

UNITED STATES PATENT OFFICE 19,122

CHICK BOX

George E. Bomberger, Indianapolis, Ind., assignor to Anderson Box Company, Indianapolis, Ind., a corporation of Indiana Original No. 1,714,295, dated May 21, 1929, Serial No. 254,933, February 17, 1928. Application for reissue November 23, 1933, Serial No. 699,395

20 Claims. (Cl. 229—6)

The invention relates to a ventilated chick box construction.

The chief object of this invention is to produce a chick box that is ventilated and which will readily stack but which will not prevent air having access to a portion of the cover so that ventilation can be obtained therethrough when the boxes are in stacked relation.

The chief feature of the invention consists in the formation of the cover in stepped or offset relation so as to provide, when the boxes are stacked, a ventilating channel or space between adjacent boxes. The box is also complementarily formed to accommodate, receive and support the stepped or offset cover.

Another feature of the invention consists in forming the entire top of the box with two end portions lying in substantially the same plane and with an intermediate depressed portion that is provided with ventilating apertures so that when another article or similar box is superposed thereon, it will be supported by the two end planes of appreciable width upon the top of the lower box and the intermediate portion of the bottom of the superposed box will be spaced from the depressed intermediate portion of the top of supporting box, thereby permitting air to pass between the two boxes in the channel formed therebetween and into the lower supporting box through the apertures of the depressed intermediate portion of the lower supporting box.

A further feature of the invention consists in the reinforcing partitions provided for reinforcing the box and forming compartments therein.

The full nature of the invention will be understood from the accompanying drawing and the following description and claims.

Figure 1:
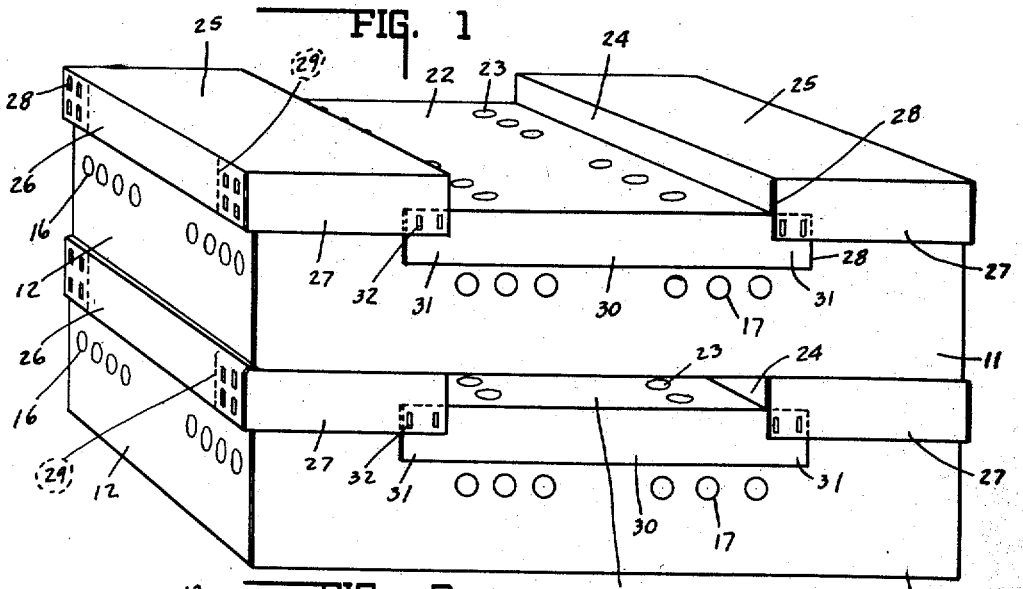

In the drawing, Fig. 1 is a perspective view of two boxes arranged in stacked relation, illustrating an air passage formed therebetween.

Figure 2:
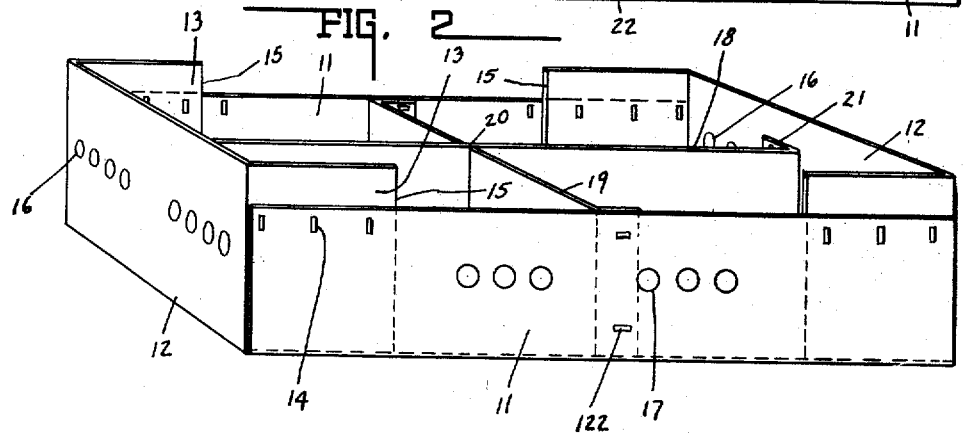

Fig. 2 is a perspective view of the box with the cover removed.

In the drawing there is illustrated a shipping box of fibre board, or corrugated paper which embodies the invention and is suitable for shipping small live animals or birds and is of the class commonly called "chick boxes".

Heretofore to prevent smothering of the birds or animals within the box, spacing members in the form of strips were added to the bottom or to the top or both of the box and thus, two adjacent boxes in stacked formation were provided with a passage or air space therebetween, by which air could enter the box through the several openings provided in the cover. Heretofore, such separation has been obtained by gluing or nailing wooden strips about one inch square in cross section across either end of each cover. Such addition is expensive in that there is the cost of the spacing strips, the cost of attaching same to the box and the postage cost, by reason of the increased weight. Also variations of the weight of the strips necessitate individual weighing of each box to apply the proper postage.

The present invention eliminates this necessity. The box includes a bottom; a pair of side walls 11 and a pair of end walls 12, all being continuations of the bottom and formed from a blank by suitably cutting, scoring and bending into the position as shown in Fig. 2. Each of the end walls 12 extends above and projects upwardly beyond the plane of the side walls 11 and the lateral extensions 13 of the end walls 12 lie parallel to the side walls 11 and they are secured thereto as indicated at 15. The adjacent edges 15 of the adjacent pairs of lateral extensions 13 form a trough arrangement in the side wall 11. The end walls are apertured as at 16 and the side walls at 17 for ventilation. To reinforce the box and form compartments therein, a pair of bracing partitions 18 and 19 are provided, each having a slotted matched connection at the center 20 and each including lateral extensions 21 for anchorage as at 122 to the adjacent side or end wall. The height of the partitions 18 and 19 is substantially that of the side wall.

The cover is complementarily formed and includes a main and intermediate body portion 22 apertured as at 23. Extending upwardly therefrom are the offset portions 24, connected to which, are the end portions 25 of said top. Depending at each end from the top portions 25 are the end edges 26 and depending from the side portions of the top portions 25 are the portions 27, same being secured together as at 28, the partial side edge 27 including a lateral extension or flap 29 adapted to lie adjacent the end edge member 26. Median portion 22 of the top includes a side edge 30 which is extended as at 31 beyond said top portion towards the ends and the extension 31 is substantially equal in length to the width of the offset 24 and the remainder of the stock constitutes the side edge portions 27, the parting being made at 28. The length of the extension 29 is substantially that of the width of the end edge 26 so that a substantially square blank can be utilized and after being cut and scored the parts are secured together in cover form as at 28 in the corners and as at 32 intermediate the ends which maintain said cover in the offset of channelled relation.

By reason of the foregoing construction, the box and the cover can be formed from substantially rectangular blanks without any wastage and ventilating perforations can be formed therein in a well known manner. When the boxes are arranged in stacked relation—see Fig. 1—a ventilating passage is provided between adjacent boxes, the air entering the boxes through the ventilating openings 23.

It will also be apparent that instead of elevating the ends and depressing the midportion of the box and cover, the same might be reversed, subject, however, to the same condition found in the first form that the elevated portion include not less than half the total area of the box.

The invention claimed is:—

1. A shipping box comprising a box bottom and a box top, said top including an offset portion and the bottom including a similar portion for registration therewith to form a ventilation passage when said box is arranged in stacked relation with another box.

2. A shipping box top including an intermediate portion, a pair of offset portions secured thereto at opposite sides, a pair of end portions each secured to an offset portion and parallel to the intermediate portion, and edge portions extending angularly of the end and intermediate portions and secured together in overlapping relationship adjacent the offset portions.

3. A shipping box top of the character defined by claim 2 characterized by the top being formed from a substantially quadrilateral blank without wastage, the remaining portion of the blank constituting edge portions secured to the end portions of the top and providing extensions in the form of flaps for anchorage to the side edge portions to secure the same in top formation.

4. A shipping box including a bottom portion, a pair of sides secured thereto and extending transversely thereof, a pair of ends similarly arranged and terminating at a greater distance from the bottom than the sides, and flaps having the same depth as the ends and constituting extensions thereof and arranged to lie parallel and be secured to the sides and project above the same, said flap termination being in spaced relation for forming a notch in the completed side wall of the box.

5. An article as defined by claim 4, characterized by the length of the flap being equal in length to the width of the side wall whereby the blank is substantially quadrilateral and forms the box without wastage.

6. A shipping box comprising a box bottom and a box top, said top including an intermediate offset portion, two upstanding portions and two end portions operatively associated together to completely close the box and extending across the full width of the box, and the bottom including side and end wall structures, each side wall structure having a recess in its upper edge corresponding to the offset and registering therewith to form a ventilating passage extending completely across the box when another box is stacked upon the first mentioned box.

7. A device as defined by claim 6, characterized by the addition of transversely arranged partition means, said partition means including an interlocking slotted connection and the partition means extending substantially parallel to side wall structures terminating at its upper edge portion registering with the offset portion in a plane immediately adjacent the lower surface of said offset portion when the box is closed.

8. A shipping box comprising a box bottom and a box top, said top including an intermediate offset portion including ventilating apertures, two upstanding portions and two end portions operatively associated together to completely close the box and extending across the full width of the box, and the bottom including side and end wall structures, certain of said wall structures having ventilating apertures, each side wall structure in its upper edge having a recess corresponding to the offset and registering therewith to form a ventilating passage extending completely across the box when another box is stacked upon the first mentioned.

9. A device as defined by claim 8, characterized by the addition of transversely arranged partition means, said partition means including an interlocking slotted connection and the partition means extending substantially parallel to side wall structures terminating at its upper edge portion registering with the offset portion in a plane immediately adjacent the lower surface of said offset portion when the box is closed.

10. A shipping box comprising a box bottom and a box top, said top including an intermediate offset portion, two upstanding portions and two end portions, each end portion having a greater width than the upstanding portion and of less width than the intermediate portion, all portions having a length approximately the width of the box and operatively associated together to completely close the box and extending substantially across the full width of the box, and the bottom including side and end wall structures, each side wall structure having a recess in its upper edge corresponding to the offset and registering therewith to form a ventilating passage above the offset portion when another box is stacked upon the first mentioned box.

11. A device as defined by claim 10, characterized by the addition of transversely arranged partition means, said partition means including an interlocking slotted connection and the partition means extending substantially parallel to side wall structures terminating at its upper edge portion registering with the offset portion in a plane immediately adjacent the lower surface of said offset portion when the box is closed.

12. A shipping box comprising a box bottom and a box top, said top including an intermediate offset portion, two upstanding portions and two end portions all operatively associated together to completely close the box and the bottom including end and side wall structures, one of the adjacent walls of the end and side wall structures having an overlapping extension upon one wall and suitably secured to the other wall, said extension being scoringly connected to the wall with which it is integral and of substantially the same height as said supporting wall, each side wall structure having a recess in its upper edge corresponding to the offset and registering therewith to form a ventilating passage above the offset portion when another box is stacked upon the first mentioned box.

13. A device as defined by claim 12, characterized by said end portions being of greater width than the upstanding portions and of less width than the intermediate portion, said portions having a length approximately the width of the box.

14. A device as defined by claim 12, characterized by the addition of transversely arranged partition means, said partition means including an interlocking slotted connection and the partition means extending substantially parallel to side wall structures terminating at its upper edge portion registering with the offset portion in a plane immediately adjacent the lower surface of said offset portion when the box is closed.

15. A shipping box comprising a box bottom and a box top, said top including two spaced portions lying in substantially the same plane, an intermediate portion lying in a plane at a different elevation and positioned in offset relation with reference to the two end portions and having portions similarly directed and angularly associated with said intermediate portion and operatively associated with the end portions to completely close the box, and side and end wall structures, each side wall structure in side elevation having a top edge substantially corresponding to the projected top surface of the box.

16. A device as defined by claim 15, characterized by the two coplaner portions of the top, each being of considerable width and constituting a relatively wide bearing support for another box when stacked thereon and being positioned adjacent the end of the first mentioned box and providing a ventilating passage beneath the second mentioned box.

17. A device as defined by claim 15, characterized by the addition of transversely arranged partition means, said partition means including an interlocking slotted connection and the partition means extending substantially parallel to side wall structures terminating at its upper edge portion registering with the offset portion in a plane immediately adjacent the lower surface of said offset portion when the box is closed.

18. A shipping box comprising a box bottom and top, said top including two spaced portions of considerable width lying in substantially the same plane, an intermediate portion offset relative thereto and apertured for ventilation, and side and end wall structures, said side wall structure having in elevation a top edge corresponding to the projected top surface of the box to form a passage across the top of the box and between the box top and another box when superposed thereon and supported upon said wide spaced portions.

19. A shipping box comprising side and end wall structures, a bottom and a top, and transversely arranged partitions therein, said top including two spaced portions of considerable width and an intermediate portion offset downwardly therefrom and apertured for ventilation, each side wall structure including a wall forming member of substantially uniform height throughout, some of said wall structures being apertured for lateral ventilation, each side wall structure being suitably secured to the adjacent end wall structure by a scored connected extension of one wall structure lying substantially parallel to the other wall structure, said spaced portions being adapted to support another box and said side wall member being arranged to provide lateral ventilation to the passage formed in the box top when the other box is superposed thereon.

20. A device as defined by claim 19 characterized by one of said partitions extending substantially parallel to the side wall structures and having its upper edge beneath the offset portion terminating immediately adjacent the lower surface of said offset portion when the box is closed.

GEORGE E. BOMBERGER.